United States Patent [19]

Datta et al.

[11] Patent Number: 4,921,727
[45] Date of Patent: May 1, 1990

[54] SURFACE TREATMENT OF SILICA-COATED PHOSPHOR PARTICLES AND METHOD FOR A CRT SCREEN

[75] Inventors: Pabitra Datta, West Windsor Twp., Mercer County; Ronald N. Friel, Hamilton Twp., Mercer County, both of N.J.

[73] Assignee: RCA Licensing Corporation, Princeton, N.J.

[21] Appl. No.: 287,355

[22] Filed: Dec. 21, 1988

[51] Int. Cl.$^5$ ............................................. B05D 3/12
[52] U.S. Cl. ....................................... 427/57; 427/64; 427/68
[58] Field of Search .............................. 427/64, 57, 68

[56] References Cited

U.S. PATENT DOCUMENTS

| | | | |
|---|---|---|---|
| 2,625,734 | 1/1953 | Law | 29/25.13 |
| 3,475,169 | 10/1969 | Lange | 96/1 |
| 3,489,556 | 1/1970 | Drozd | 96/1 |
| 3,489,557 | 1/1970 | Lange et al. | 96/1 |
| 3,522,071 | 7/1970 | Yokota et al. | 427/64 |
| 3,927,224 | 12/1975 | Levene | 427/64 |
| 4,049,845 | 9/1977 | Lozier et al. | 427/68 |
| 4,287,229 | 9/1981 | Watanabe et al. | 427/64 |
| 4,379,762 | 4/1983 | Chiyoda et al. | 427/64 |
| 4,440,831 | 4/1984 | Brownlow | 427/64 |
| 4,448,866 | 5/1984 | Olieslagers et al. | 430/24 |
| 4,620,133 | 10/1986 | Morrell et al. | 315/15 |
| 4,717,590 | 1/1988 | Wolfe et al. | 427/68 |
| 4,737,434 | 4/1988 | Gruber et al. | 430/120 |
| 4,741,984 | 5/1988 | Imai et al. | 430/106.6 |

*Primary Examiner*—Janyce Bell
*Attorney, Agent, or Firm*—Eugene M. Whitacre; Dennis H. Irlbeck; Vincent J. Coughlin, Jr.

[57] ABSTRACT

A method of surface-treating dry-powdered phosphor particles to control the triboelectric charge characteristics thereof includes the steps of providing the phosphor particles with a first coating of silica, dissolving a coupling agent selected from the group consisting of silanes and titanates in a suitable solvent to form a mixture, surface-coating the silica-coated phosphor particles with the mixture to provide a second coating of the coupling agent on the phosphor particles, filtering the surface-treated particles, rinsing the surface-treated particles with the solvent, and drying the surface-treated particles. The resultant dry-powdered surface-treated phosphor particles are used to make a luminescent viewing screen for a CRT. The coupling agent overlying the silica coating controls the triboelectric charging characteristics of the phosphor particles during the electrophotographic manufacturing of the screen.

3 Claims, 2 Drawing Sheets

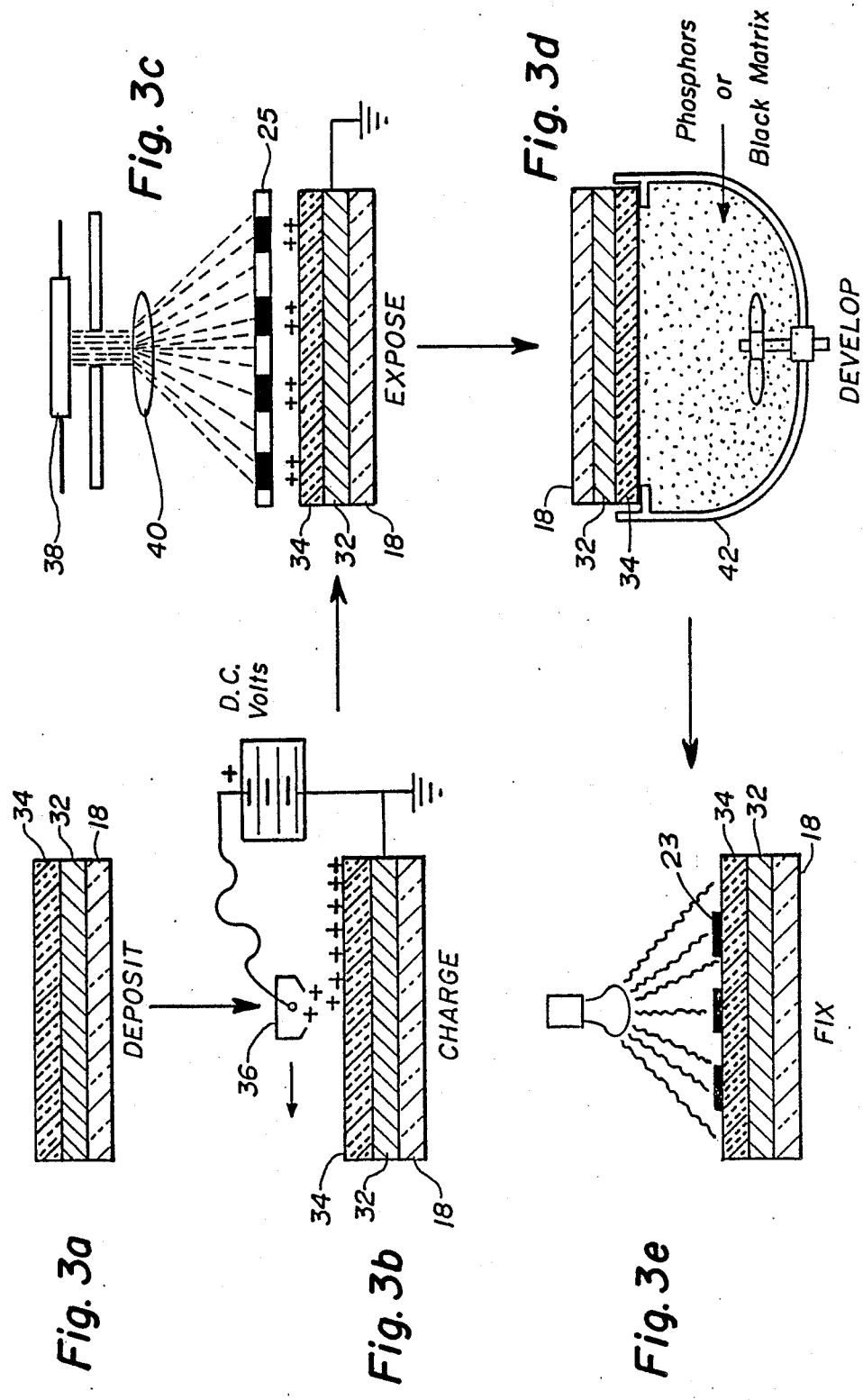

SURFACE TREATMENT OF SILICA-COATED PHOSPHOR PARTICLES AND METHOD FOR A CRT SCREEN

The present invention relates to electrophotographically manufacturing a viewing screen for a cathode-ray tube (CRT), and more particularly to a method of surface-treating dry-powdered phosphor particles with a coupling agent to control the triboelectric charging characteristics thereof.

BACKGROUND OF THE INVENTION

A conventional shadow-mask-type CRT comprises an evacuated envelope having therein a viewing screen comprising an array of phosphor elements of three different emission colors arranged in a cyclic order, means for producing three convergent electron beams directed towards the screen, and a color selection structure or shadow mask comprising a thin multiapertured sheet of metal precisely disposed between the screen and the beam-producing means. The apertured metal sheet shadows the screen, and the differences in convergence angles permit the transmitted portions of each beam to selectively excite phosphor elements of the desired emission color. A matrix of light-absorptive material surrounds the phosphor elements.

In one prior process for forming each array of phosphor elements on a viewing faceplate of the CRT, the inner surface of the faceplate is coated with a slurry of a photosensitive binder and phosphor particles adapted to emit light of one of the three emission colors. The slurry is dried to form a coating, and a light field is projected from a source through the apertures in the shadow mask and onto the dried coating, so that the shadow mask functions as a photographic master. The exposed coating is subsequently developed to produce the first color-emitting phosphor elements. The process is repeated for the second and third color-emitting phosphor elements, utilizing the same shadow mask, but repositioning the light source for each exposure. Each position of the light source approximates the convergence angle of one of the electron beams which excites the respective color-emitting phosphor elements. A more complete description of this process, known as the photolithographic wet process, can be found in U.S. Pat. No. 2,625,734, issued to H. B. Law on Jan. 20, 1953.

A drawback of the above-described wet process is that it may not be capable of meeting the higher resolution demands of the next generation of entertainment devices and the even higher resolution requirements for monitors, work stations and applications requiring color alpha-numeric text. Additionally, the wet photolithographic process (including matrix processing) requires 182 major processing steps, necessitates extensive plumbing and the use of clean water, requires phosphor salvage and reclamation, and utilizes large quantities of electrical energy for exposing and drying the phosphor materials.

U.S. Pat. No. 3,475,169, issued to H. G. Lange on Oct. 28, 1969, discloses a process for electrophotographically screening color cathode-ray tubes. The inner surface of the faceplate of the CRT is coated with a volatilizable conductive material and then overcoated with a layer of volatilizable photoconductive material. The photoconductive layer is then uniformly charged, selectively exposed with light through the shadow mask to establish a latent charge image, and developed using a high molecular weight carrier liquid. The carrier liquid bears, in suspension, a quantity of phosphor particles of a given emissive color that are selectively deposited onto suitably charged areas of the photoconductive layer, to develop the latent image. The charging, exposing and deposition process is repeated for each of the three color-emissive phosphors, i.e., green, blue, and red, of the screen. An improvement in electrophotographic screening is described in U.S. Pat. No. 4,448,866, issued to H. G. Olieslagers et al. on May 15, 1984. In that patent, phosphor particle adhesion is said to be increased by uniformly exposing, with light, the portions of the photoconductive layer lying between adjacent portions of the deposited pattern of phosphor particles after each deposition step, so as to reduce or discharge any residual charge and to permit a more uniform recharging of the photoconductor for subsequent depositions. Because the latter two patents disclose an electrophotographic process that is, in essence, a wet process, many of the drawbacks described above, with respect to the wet photolithographic process of U.S. Pat. No. 2,625,734, also are applicable to the wet electrophotographic process.

Copending patent applications filed concurrently herewith, entitled METHOD OF ELECTROPHOTOGRAPHICALLY MANUFACTURING A LUMINESCENT SCREEN ASSEMBLY FOR A CATHODE-RAY TUBE, and METHOD OF SURFACE TREATMENT OF CARRIER BEADS FOR USE IN ELECTROPHOTOGRAPHIC SCREEN PROCESSING, respectively describe an improved process for manufacturing CRT screen assemblies using triboelectrically charged, dry-powdered screen structure materials, and surface-treated carrier beads having a coupling agent thereon to control the polarity and magnitude of the imparted charge. The above-identified copending patent applications are assigned to the assignee of the present invention and incorporated by reference herein for the purpose of disclosure. Applicants have determined that while CRT viewing screens can be electrophotographically manufactured using untreated phosphor particles, surface treatment of the phosphor particles increase the triboelectric charge on the phosphor particles, thereby causing a greater quantity of phosphor particles to be attached to each carrier bead. This improves the efficiency of the dry electrophotographic process and increases, by a factor of about 2 to 9 times, the screen weight for screens manufactured using surface-treated phosphors.

SUMMARY OF THE INVENTION

In accordance with the present invention, a method of surface-treating dry-powdered phosphor particles for use in manufacturing a viewing screen for a CRT, to control the triboelectric charge characteristics thereof, includes the steps of providing the phosphor particles with a first coating of silica; dissolving a coupling agent selected from the group consisting of silanes and titanates in a suitable solvent to form a mixture; surface-coating the silica-coated phosphor particles with the mixture to provide a second coating of the coupling agent on the phosphor particles; filtering the surface-treated particles; rinsing the surface-treated particles with the solvent and drying the surface-treated particles. The resultant dry-powdered surface-treated phosphor particles are used to make a luminescent viewing screen for a CRT. The coupling agent overlying the silica coating controls the triboelectric charging characteristics of the phosphor particles during the electrophotographic manufacturing of the screen.

BRIEF DESCRIPTION OF THE DRAWINGS

FIGS. 3a through 3e show various steps in the manufacturing of the tube shown in FIG. 1.

DETAILED DESCRIPTION OF THE PREFERRED EMBODIMENTS

Figure 1:
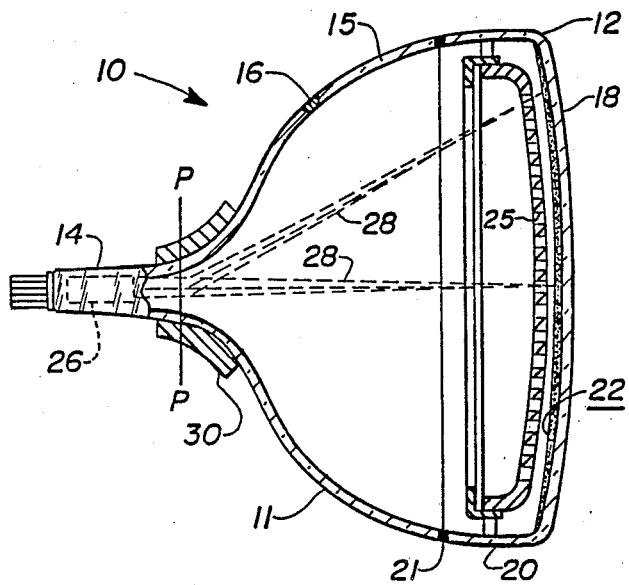
FIG. 1 is a plan view, partially in axial section of a color cathode-ray tube made according to the present invention.
Figure 2:
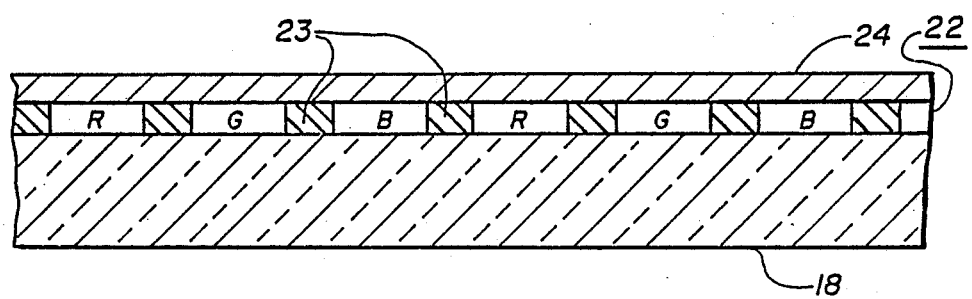
FIG. 2 is a section of a screen assembly of the tube shown in FIG. 1.

FIG. 1 shows a color CRT having a glass envelope 11 comprising a rectangular faceplate panel 12 and a tubular neck 14 connected by a rectangular funnel 15. The funnel 15 has an internal conductive coating (not shown) that contacts an anode button 16 and extends into the neck 14. The panel 12 comprises a viewing faceplate or substrate 18 and a peripheral flange or sidewall 20, which is sealed to the funnel 15 by a glass frit 21. A three color phosphor screen 22 is carried on the inner surface of the faceplate 18. The screen 22, shown in FIG. 2, preferably is a line screen which includes a multiplicity of screen elements comprised of red-emitting, green-emitting and blue-emitting phosphor strips R, G and B, respectively, arranged in color groups of three stripes or triads in a cyclic order and extending in a direction which is generally normal to the plane in which the electron beams are generated. In the normal viewing position for this embodiment, the phosphor stripes extend in the vertical direction. Preferably, the phosphor stripes are separated from each other by a light-absorptive matrix material 23, as is known in the art. Alternatively, the screen can be a dot screen. A thin conductive layer 24, preferably of aluminum, overlies the screen 22 and provides a means for applying a uniform potential to the screen as well as reflecting light, emitted from the phosphor elements, through the faceplate 18. The screen 22 and the overlying aluminum layer 24 comprise a screen assembly.

Again with respect to FIG. 1, a multi-apertured color selection electrode or shadow mask 25 is removably mounted, by conventional means, in predetermined spaced relation to the screen assembly. An electron gun 26, shown schematically by the dashed lines in FIG. 1, is centrally mounted within the neck 14, to generate and direct these electron beams 28 along convergent paths, through the apertures in the mask 25, to the screen 22. The gun 26 may be, for example, a bi-potential electron gun of the type described in U.S. Pat. No. 4,620,133, issued to Morrell et al. on Oct. 28, 1986, or any other suitable gun.

The tube 10 is designed to be used with an external magnetic deflection yoke, such as yoke 30 located in the region of the funnel-to-neck junction. When activated, the yoke 30 subjects the three beams 28 to magnetic fields which cause the beams to scan horizontally and vertically in a rectangular raster over the screen 22. The initial plane of deflection (at zero deflection) is shown by the line P—P in FIG. 1, at about the middle of the yoke 30. For simplicity, the actual curvatures of the deflection beam paths in the deflection zone are not shown.

The screen 22 is manufactured by a novel electrophotographic process that is schematically represented in FIGS. 3a through 3e and described in the former above-identified copending patent application. Initially, the panel is washed with a caustic solution, rinsed with water, etched with buffered hydrofluoric acid and rinsed once again with water, as is known in the art. The inner surface of the viewing faceplate 18 is then coated with a layer 32 of an electrically conductive material which provides an electrode for an overlying photoconductive layer 34. The conductive layer 32 is coated with the photoconductive layer 34, comprising a volatilizable organic polymeric material, a suitable photoconductive dye and a solvent. The composition and method of forming the conductive layer 32 and the photoconductive layer 34 are described in the former above-identified copending patent application.

The photoconductive layer 34 overlying the conductive layer 32 is charged in a dark environment by a conventional positive corona discharge apparatus 36, schematically shown in FIG. 3b, which moves across the layer 34 and charges it within the range of +200 to +700 volts, +200 to +400 volts being preferred. The shadow mask 25 is identified in the panel 12, and the positively-charged photoconductor is exposed, through the shadow mask, to the light from a xenon flash lamp 38 disposed within a conventional three-in-one lighthouse (represented by lens 40 of FIG. 3c). After each exposure, the lamp is moved to a different position, to duplicate the incident angle of the electron beams from the electron gun. Three exposures are required, from three different lamp positions, to discharge the areas of the photoconductor where the light-emitting phosphors subsequently will be deposited to form the screen. After the exposure step, the shadow mask 25 is removed from the panel 12 and the panel is moved to a first developer 42 (FIG. 3d). The first developer contains suitably prepared dry-powdered particles of a light-absorptive black matrix screen structure material, and surface-treated insulative carrier beads (not shown) which have a diameter of about 100 to 300 microns and which impart a triboelectrical charge to the particles of black matrix material, as described herein.

Suitable black matrix materials generally contain black pigments which are stable at a tube processing temperature of 450° C. Black pigments suitable for use in making matrix materials include: iron manganese oxide, iron cobalt oxide, zinc iron sulfide and insulating carbon black. The black matrix material is prepared by melt-blending the pigment, a polymer and a suitable charge control agent which controls the magnitude of the triboelectric charge imparted to the matrix material. The material is ground to an averge particle size of about 5 microns.

The black matrix material and the surface-treated carrier beads are mixed in the developer 42, using about 1 to 2 percent by weight of black matrix material. The materials are mixed so that the finely divided matrix particles contact and are charged, e.g., negatively, by the surface-treated carrier beads. The negatively-charged matrix particles are expelled from the developer 42 and attracted to the positively-charged, unexposed area of the photoconductive layer 34, to directly develop that area. Infrared radiation is then used to fix the matrix material by melting or thermally bonding the polymer component of the matrix material to the photoconductive layer, to form the matrix 23 shown in FIGS. 2 and 3e.

The photoconductive layer 34 containing the matrix 23 is uniformly recharged to a positive potential of about 200 to 400 volts, for the application of the first of three color-emissive, dry-powdered, phosphor screen structure materials. The shadow mask 25 is reinserted into the panel 12, and selective areas of the photoconductive layer 34, corresponding to the locations where green-emitting phosphor material will be deposited, are exposed to visible light from a first location within the lighthouse, to selectively discharge the exposed areas. The first light location approximates the convergence angle of the green phosphor-impinging electron beam. The shadow mask 25 is removed from the panel 12, and the panel is moved to a second developer 42, containing suitably prepared dry-powdered particles of green-emitting phosphor screen structure material and surface-treated carrier beads. The phosphor particles are surface-treated with a suitable charge-controlling material as described herein. One thousand grams of surface-treated carrier beads are combined with 15 to 25 grams of surface-treated phosphor particles in the second developer 42. The carrier beads are treated to impart a e.g. positive, charge on the phosphor particles. The positively-charged green-emitting phosphor particles are expelled from the developer, repelled by the positively-charged areas of the photoconductive layer 34 and matrix 23, and deposited onto the discharged, light-exposed areas of the photoconductive layer, in a process known as reversal developing. The deposited green-emitting phosphor particles are fixed to the photoconductive layer by exposing the surface-treated phosphor to infrared radiation which melts or thermally bonds the phosphor to the photoconductive layer.

The process of charging, exposing, developing and fixing is repeated for the dry-powdered, blue- and red-emitting, surface-treated phosphor particles of screen structure material. The exposure to visible light, to selectively discharge the positively-charged areas of the photoconductive layer 34, is from a second and then from a third position within the lighthouse, to approximate the convergence angles of the blue phosphor- and red phosphor-impinging electron beams, respectively. The triboelectrically positively-charged, dry-powdered phosphor particles are mixed with the surface-treated carrier beads in the ratio described above and expelled from a third and then a fourth developer 42, repelled by the positively charged areas of the previously deposited screen structure materials, and deposited on the discharged areas of the photoconductive layer 34, to provide the blue- and red-emitting phosphor elements, respectively.

In the preferred embodiment, the initial surface-treatment step includes forming a continuous coating of silicon dioxide (silica) on the surface of each phosphor particle, e.g., blue (ZnS/Ag), green (ZnS/Cu, Au, Al) and red ($Y_2O_2S$/Eu).

EXAMPLE 1

To provide this coating, 6.6 grams of a colloidal silica sol sold under the trademark NYCOL 2030 EC (available from the PQ Corporation, Asland, MA 01721) are dissolved in 1 liter of isopropanol. One kilogram of blue phosphor, such as ZnS/Ag, is added to the solution and stirred for two hours to fully disperse the phosphor particles. The resulting continuous silicon dioxide (silica)-coated phosphor particles are dried in a rotary evaporator at a temperature of 85° C. until all the solvent is removed from the mixture. The silica-coated dried phosphor and a virgin uncoated phosphor were tested for charge-to-mass ratio and screen weight by mixing 3 grams of phosphor with 150 grams of fluorosilane surface-treated carrier beads. The fluorosilane-treated beads are triboelectrically negative and thus induce positive charge on the phosphor particles. The test procedure is described herein, and the results for the virgin phosphor (Z936 blue) and the silica coated phosphor (Example 1) are listed in TABLE 1. The above-described silica coating is also applied to the green (ZnS/Cu,Au,Al) phosphor and the red core ($Y_2O_2S$/Eu) phosphor using the process steps described herein. An alternative colloidal silica sol that may be used is sold under the trademark Cab-O-Sperse grade-B (available from the Cabot Corporation, Tuscola, Ill.).

The silica coating on the phosphor particles provides a hydroxy functional group in the form of silanol. Silane or titanate coupling agents react with silanol groups to form covalent chemical bonds. Phosphors initially treated to provide a continuous silica coating and then overcoated with a silane or titanate coupling agent have a surface with a functional organic group determined by the coupling agent used as the overcoating. Such organic groups on surface-treated phosphors react with the functional groups provided on the carrier beads, as described in the copending patent application entitled METHOD OF SURFACE TREATMENT OF CARRIER BEADS FOR USE IN ELECTROPHOTOGRAPHIC SCREEN PROCESSING, to determine the magnitude of the triboelectric charge on the surface-treated phosphor particles.

EXAMPLE 2

One-tenth (0.1) gram of N (2-aminoethyl-3-aminopropyl) methyl dimethoxysilane (amino #1) is dissolved in 200 ml. of isopropanol to form a coating solution. One hundred grams of silica-coated blue phosphor particles, made by the process of example 1, are added to the coating solution and ultrasonically stirred for about 10 minutes. The aminosilane surface-treated blue phosphor is dried in a rotary evaporator. The dried phosphor is then sieved through a 400 mesh screen.

Three (3) grams of dry-powdered, aminosilane surface-treated blue phosphor material are mixed with about 100 grams of fluorosliane surface-treated carrier beads. The fluorosilane-treated beads are triboelectrically negative and thus induce a positive charge on the aminosilane-treated blue phosphor particles. The charge-to-mass ratio and the electrophotographic screen (EPS)-characteristics (screen weight of the phosphor manufactured by this process were tested as described herein, and the results are listed in TABLE 1.

EXAMPLE 3

Same as example 2, except that N-(aminoethyl aminopropyl) triethoxysilane (amino #2) replaces amino #1. All other materials and process steps are unchanged. Test results are listed in TABLE 1.

EXAMPLE 4

Same as example 2, except that 3-(aminopropyl)-dimethyl-ethoxysilane (amino #3) replaces amino #1. All other materials and process steps are unchanged. Test results are listed in TABLE 1.

EXAMPLE 5

Same as example 2, except that (aminopropyl) triethoxysilane (amino #4) replaces amino #1. All other materials and process steps are unchanged. Test results are listed in TABLE 1.

EXAMPLE 6

Same as example 2, except that (methacryloxyproply)triethoxysilane (acrylo #6) replaces amino #1. All other materials and process steps are unchanged. Test results are listed in TABLE 1.

EXAMPLE 7

One-tenth (0.1) gram of isopropyl tri (dioctyl-pyrophosphato) titanate (Titanate) is dissolved in 200 ml of a 50:50 mixture of isopropanol and heptane to form a coating solution. One hundred grams of silica-coated blue phosphor particles (from Example 1) are added to the coating solution and stirred for two hours. The titanate surface-treated blue phosphor is dried in a rotary evaporator, and the dried phosphor is then sieved through a 400 mesh screen. The test process is described herein, and the results are listed in TABLE 1.

EXAMPLE 8

One-tenth (0.1) gram of amino #1 is dissolved in 200 ml of isopropanol as described in example 1, to form a coating solution. One hundred grams of silica-coated green phosphor particles are added to the coating solution and stirred for about two hours. The aminosilane surface-treated green phosphor material is dried in a rotary evaporator and then sieved through a 400 mesh screen.

Three (3) grams of the dry-powdered, aminosilane surface-treated green phosphor material are mixed with 100 grams of fluorosilane surface-treated carrier beads and tested as described herein. The test results are listed in TABLE 2. A virgin green phosphor (ZnS/Cu,Au,Al) having neither a silica coating nor an aminosilane coating, is used as a control for green phosphors in Table 2.

EXAMPLE 9

Same as example 8, except that amino #2 replaces amino #1. All other materials and process steps are unchanged. The test results are listed in TABLE 2.

EXAMPLE 10

Same as example 8, except that amino #3 replaces amino #1. All other materials and process steps are unchanged. The test results are listed in TABLE 2.

EXAMPLE 11

Same as example 8, except that amino #4 replaces amino #1. All other materials and process steps are unchanged. The test results are listed in TABLE 2.

EXAMPLE 12

One-tenth (0.1) gram of amino #1 is dissolved in 200 ml of isopropanol to form a coating solution. One hundred grams of silica-coated red phosphor particles ($Y_2O_2S/Eu$) are added to the coating solution and stirred for about two hours. The aminosilane surface-treated red phosphor material is dried in a rotary evaporator and then sieved through a 400 mesh screen.

Three (3) grams of the dry-powdered, aminosilane surface-treated red phosphor material are mixed with 100 grams of fluorosilane surface-treated carrier beads and tested as described herein. The test results are listed in TABLE 2. A virgin red phosphor ($Y_2O_2S/Eu$) having neither a silica coating nor an aminosilane coating, is used as a control for red phosphors in Table 2.

EXAMPLE 13

Same as example 12, except that amino #2 replaces amino #1. All other materials and process steps are unchanged. Test results are listed in TABLE 2.

EXAMPLE 14

Same as example 12, except that amino #3 replaces amino #1. All other materials and process steps are unchanged. Test results are listed in TABLE 2.

EXAMPLE 15

Same as example 12, except that amino #4 replaces amino #1. All other materials and process steps are unchanged. Test results are listed in TABLE 2.

TABLE 1

Virgin blue phosphors and silane-treated blue phosphors contacted with fluorosilane-treated glass beads for positively-charged phosphors.

| Type of Phosphor | Coating | Positive Charge-to-Mass Ratio ($\mu$C/gm) | EPS-Characteristics Screen. Wt (mg/cm2) |
|---|---|---|---|
| Blue | None | 2.2 | 0.8 |
| Example 1 | Silica | 4.2 | 1.5 |
| Example 2 | Amino #1 | 47 | 3.9 |
| Example 3 | Amino #2 | 35 | 3.1 |
| Example 4 | Amino #3 | 36 | 3.0 |
| Example 5 | Amino #4 | 21 | 2.1 |
| Example 6 | Acrylo #6 | 14 | 2.0 |
| Example 7 | Titanate | 18 | 1.6 |

TABLE 2

Virgin green and red phosphors and silane-treated green and red phosphors contacted with fluorosilane-treated glass beads for positively-charge phosphors

| Type of Phosphor | Coating | Positive Charge-to-Mass Ratio ($\mu$C/gm) | EPS-Characteristics Screen. Wt (mg/cm2) |
|---|---|---|---|
| Green | None | 0.2 | 0.5 |
| Example 8 | Amino #1 | 35 | 3.0 |
| Example 9 | Amino #2 | 38 | 3.5 |
| Example 10 | Amino #3 | 29 | 2.9 |
| Example 11 | Amino #4 | 25 | 2.0 |
| Red | None | 0.9 | 1.0 |
| Example 12 | Amino #1 | 45 | 4.1 |
| Example 13 | Amino #2 | 43 | 4.0 |
| Example 14 | Amino #3 | 40 | 3.5 |
| Example 15 | Amino #4 | 34 | 3.6 |

The test results were determined using a test panel, not shown, which consists of an insulated board having a metal conductor laminated on each major surface, with a centrally disposed aperture extending through the major surfaces of the board and the conductors. Preferably, the aperture is about 2.54 cm in diameter. A metal screen of about 50 to 100 mesh extends across the aperture and is connected to one of the metal conductors. A TIC-coated glass plate extends across the aperture and is disposed on the other metal conductor, so that the TIC-coating is in contact therewith. For the measurement of positively-charged phosphor particles, a potential of 100 to 600 volts is applied to the conductor, with the conductor which contacts the TIC coating being grounded. The potential difference between the mesh and the glass is about $10^3$ V/cm. The test panel is located about 7.62 cm above a developer containing the surface-treated phosphor and carrier beads as described in examples 1, 2, 7, 8 and 12. The developer is closed at one end by a screen suitable for passing the finely divided phosphor particles, but not the carrier beads. A puff of air (velocity about $10^4$ cm sec) separates the phosphor particles from the carrier beads and expels the charged (in this case positively-charged) phosphor particles from the developer towards the metal screen and TIC-coated glass plate. The resultant electrostatic charge on the TIC-coated plate is measured by an electrometer, and the mass of the phosphor particles is determined by weighing the glass plate before and after the test. The quotient of these measurements is the average triboelectric charge-to-mass ratio. The deposition area on the TIC-coated glass plate is known and controlled by the size of the aperture in the test panel. Test results are summarized in TABLES 1 and 2. In each instance, the surface-treated glass beads include a coating of fluorosilane, to impart a positive charge to the phosphor particles. A control was run for each color phosphor tested. The control phosphors were not surface-treated. The results demonstrate that the surface-treated phosphors have a much higher charge-to-mass ratio than do the untreated phosphors, and that the screen weights for surface-treated phosphors are substantially higher than for untreated phosphors. Best results were achieved by surface treating the phosphors with N-(aminoethyl aminopropyl)triethoxysilane or N(2-aminoethyl-3-aminopropyl) methyldimethoxysilane.

Other silanes found specifically useful are (n decyl) methyl dichloro-silane, (heptadecafluoro-1,1,2,2-tetrahydrodecyl)-1-dimethyl-chlorosilane and (tridecafluorooctyl-1-dimethyl-triethylsilane.

What is claimed is:

1. A method of surface-treating dry-powdered phosphor particles for use in manufacturing a viewing screen for a CRT to control the triboelectric charge characteristics of said phosphor particles including the steps of
   providing said phosphor particles with a first coating of silica,
   dissolving a coupling agent selected from the group consisting of silanes and titanates in a suitable solvent to form a mixture,
   surface-treating said silica-coated phosphor particles with said mixture to provide a second coating of said coupling agent thereon,
   filtering the surface-treated phosphor particles,
   rinsing the filtered surface-treated particles in said solvent, and
   drying said surface-treated phosphor particles.

2. The method of claim 1, wherein said mixture is formed by dissolving 0.1 gram of a silane selected from the group consisting of N(2-aminoethyl-3-aminopropyl) methyl dimethoxysilane, N-(aminoethyl aminopropyl) triethoxysilane, 3-(aminopropyl) dimethyl ethoxysilane, (aminopropyl) triethoxysilane, (methacryloxy propyl) trimethoxysilane, (n-decyl) methyldichlorosilane, (heptadecafluoro-1,1,2,2-tetrahydrodecyl)-1-dimethylchlorosilane and (tridecafluoro-1,1,2,2-tetrahydro octyl)-1-dimethyl-triethoxysilane, in 200 ml of isopropanol.

3. The method of claim 2, wherein said surface coating step includes the steps of
   (i) adding 100 grams of said silica-coated particles to said mixture, and
   (ii) ultrasonically mixing said silica-coated particles and said mixture for 10 minutes.

* * * * *

UNITED STATES PATENT AND TRADEMARK OFFICE
CERTIFICATE OF CORRECTION

PATENT NO. : 4,921,727
DATED : May 1, 1990
INVENTOR(S) : Pabitra Datta and Ronald N. Friel It is certified that error appears in the above-identified patent and that said Letters Patent is hereby corrected as shown below:

Col. 2, line 43,
change "increase" to --increases--.

Col. 4, line 21,
change "identified" to --inserted--.

Col. 6, line 43,
change "fluorosliane" to --fluorosilane--.

Col. 6, line 48,
after "weight" add --)--.

Signed and Sealed this

Tenth Day of December, 1991

Attest:

HARRY F. MANBECK, JR.

Attesting Officer

Commissioner of Patents and Trademarks